(12) United States Patent
Komashinskiy et al.

(10) Patent No.: US 10,721,247 B2
(45) Date of Patent: Jul. 21, 2020

(54) MACHINE LEARNING BASED MALWARE DETECTION SYSTEM

(71) Applicant: F-Secure Corporation, Helsinki (FI)

(72) Inventors: Dmitriy Komashinskiy, Espoo (FI); Paolo Palumbo, Espoo (FI)

(73) Assignee: F-Secure Corporation, Helsinki (FI)

( * ) Notice: Subject to any disclaimer, the term of this patent is extended or adjusted under 35 U.S.C. 154(b) by 132 days.

(21) Appl. No.: 15/823,673

(22) Filed: Nov. 28, 2017

(65) Prior Publication Data
US 2018/0159871 A1    Jun. 7, 2018

(30) Foreign Application Priority Data
Dec. 2, 2016    (GB) .................................. 1620462.0

(51) Int. Cl.
*G06F 7/04*     (2006.01)
*H04L 29/06*    (2006.01)
*G06N 20/00*    (2019.01)
*G06N 5/02*     (2006.01)

(52) U.S. Cl.
CPC ......... *H04L 63/1416* (2013.01); *G06N 20/00* (2019.01); *G06N 5/022* (2013.01); *H04L 63/145* (2013.01)

(58) Field of Classification Search
USPC ......................................................... 728/28
See application file for complete search history.

(56) References Cited

U.S. PATENT DOCUMENTS

| | | | |
|---|---|---|---|
| 8,521,667 B2 * | 8/2013 | Zhu ...................... | H04L 63/1408 706/13 |
| 9,292,688 B2 * | 3/2016 | Avasarala ............... | G06F 21/56 |
| 9,690,938 B1 * | 6/2017 | Saxe ..................... | G06F 21/563 |
| 9,705,914 B2 * | 7/2017 | Di Pietro ............ | H04L 63/1458 |

(Continued)

FOREIGN PATENT DOCUMENTS

EP    0897566 B1    8/2003

OTHER PUBLICATIONS

Nissim, Nir, et. al., "ALPD: Active Learning Framework for Enhancing the Detection of Malicious PDF Files", 2014, IEEE Joint Intelligence and Security Informatics Conference, 8 pgs.

*Primary Examiner* — Amare F Tabor
(74) *Attorney, Agent, or Firm* — Harrington & Smith (57) ABSTRACT

There are provided measures for machine learning based malware detection systems. Such measures exemplarily include analyzing a set of training data, said set of training data comprising a plurality of training data elements, wherein each of said plurality of training data elements is associated with a respective one of at least two maliciousness related properties, learning a malicious object detection model on the basis of first feature combinations of said plurality of training data elements, said first feature combinations characterizing each of said at least two maliciousness related properties, learning an anomalous data detection model on the basis of second feature combinations of said plurality of training data elements, said second feature combinations characterizing said set of training data, said anomalous data detection model being associated with said malicious object detection model, and providing said malicious object detection model and said anomalous data detection model.

17 Claims, 7 Drawing Sheets

(56) References Cited

U.S. PATENT DOCUMENTS

| | | | |
|---|---|---|---|
| 9,762,593 B1* | 9/2017 | Kennedy | H04L 63/1416 |
| 10,121,108 B2* | 11/2018 | Miserendino | G06N 5/04 |
| 2016/0028750 A1 | 1/2016 | Di Pietro et al. | |
| 2016/0154960 A1* | 6/2016 | Sharma | G06F 21/56 |
| | | | 726/25 |

* cited by examiner

MACHINE LEARNING BASED MALWARE DETECTION SYSTEM

FIELD

The present invention relates to machine learning based malware detection systems. More specifically, the present invention relates to measures (including methods, apparatuses and computer program products) for realizing machine learning based malware detection systems.

BACKGROUND

The present specification generally relates to improvements in relation to machine learning based malware detection.

Nowadays, malware ("malicious software") scanning is a vital issue in any kind of networks, and is generally directed to identify (and potentially also disinfect) any kind of malware on computer and/or communication systems, such as e.g. viruses, Trojans, worms, or the like. Malware scanning techniques include, for example, signature based scanning and heuristic based scanning.

For signature based techniques, once a malware is identified, it is analyzed and a proper distinctive signature of the file is extracted and added to a signatures database of a malware detection/protection system.

For heuristic based techniques, a generic signature or any other suitable feature combination common for a group of malware variants and distinguishing from non-malicious software is determined and it is expected that such feature combinations are generic and flexible such that also detection of yet unknown malware is enabled to a certain extent.

The present specification relates to scenarios in which a machine learning model is used to detect maliciousness of incoming, previously unseen objects, and where the performance of the model needs to be monitored.

For such an approach, a model is trained over some pre-existing data ("training data" or "training set"). This trained model is deployed to produce predictions about new relevant objects. The performance of the model needs to be controlled continuously over time, because, for example, threats evolve and training sets are not perfect (e.g., might be biased). To maintain the required level of performances, the training set needs continuous maintenance and the model needs periodical re-training.

When designing machine learning based systems for security, particularly those that aim to detect unknown, previously unseen malicious objects ("malware"), it becomes evident that maintaining such learned models and guaranteeing the quality of their decisions is not a trivial issue.

Prior art which relates to this field can be found in document EP 08 97 566 B1, disclosing monitoring and retraining a neural network.

According to this document, processing mobile operators' data for detecting "anomalous" instances (events, states and so forth) that indicate potential frauds of phones and their identifiers, bank cards etc. is addressed. In particular, a thorough review of main problems in this area is provided. This document particularly focuses on training (or updating) a new model of the same topology while the old one is still functioning, serialization of existing models, and using a persistence mechanism for keeping their state. That is, a way on how to make neural network based models' retraining fast and seamless is proposed.

Further prior art which relates to this field can be found in document US 2015 03 55 901 A1, disclosing a method and a system to automate the maintenance of data-driven analytic models.

According to this document, it is identified that a data-driven analytic model tends to misbehave, an estimate of useful time of live for the model is forecasted, and the model is modified to accommodate the noticed misbehavior on the basis of caught anomalies in controlled models' output characteristics.

Further prior art which relates to this field can be found in document US 2015 00 74 023 A1, disclosing an unsupervised behavior learning system and a method for predicting performance anomalies in distributed computing infrastructures.

According to this document, anomalies in environments that provide infrastructure as a service (IaaS) are predicted. To this end, unsupervised learning based models are utilized that are learned to identify pre-fault states of controlled virtual and physical machines and then to notify system administrators about potential faults and their reasons. In particular, states of naturally different instances (computation nodes) are monitored.

Further prior art, which relates to this field can be found in document U.S. Pat. No. 9,336,494 B1, disclosing re-training a machine learning model.

According to this document, machine learning models functioning for financial knowledge domain (e.g. price predictions, card fraud detection, financial product transactions and so forth) are addressed. In detail, it is disclosed to detect if a model misbehaves (based on control model predictions for a set of time-ordered instances within a sliding window with predefined size) and how to fix the misbehaving model.

If malware is detected on the basis of a detection model which is learned beforehand on the basis of pre-existing data ("training data" or "training set"), reliability of the decision on maliciousness of checked objects is strongly dependent on the representativeness of the pre-existing data for the checked object. If the pre-existing data (on the basis of which) is not (or not anymore) representative for expected objects to be checked, reliability of results of respective checks is deteriorated.

Accordingly, it is evident that available systems for responding to security threats suffer from various drawbacks, and it is thus desirable to improve machine learning based malware detection systems so as to overcome such drawbacks.

SUMMARY

Various exemplifying embodiments of the present invention aim at addressing at least part of the above issues and/or problems and drawbacks.

Various aspects of exemplifying embodiments of the present invention are set out in the appended claims.

According to an exemplary aspect of the present invention, there is provided a method of preparing a machine learning based malware detection, comprising analyzing a set of training data, said set of training data comprising a plurality of training data elements, wherein each of said plurality of training data elements is associated with a respective one of at least two maliciousness related properties, learning a malicious object detection model on the basis of first feature combinations of said plurality of training data elements, said first feature combinations characterizing each of said at least two maliciousness related properties, learning an anomalous data detection model on the basis of second feature combinations of said plurality of training data elements, said second feature combinations characterizing said set of training data, said anomalous data detection model being associated with said malicious object detection model, and providing said malicious object detection model and said anomalous data detection model.

According to an exemplary aspect of the present invention, there is provided a method of applying a machine learning based malware detection, comprising receiving a malicious object detection model and an anomalous data detection model, said malicious object detection model characterizing each of at least two maliciousness related properties, said anomalous data detection model being associated with said malicious object detection model and characterizing a set of training data for said malicious object detection model, receiving a maliciousness detection candidate, validating said maliciousness detection candidate against said malicious object detection model, validating said maliciousness detection candidate against said anomalous data detection model, and merging a result of said validating against said malicious object detection model and a result of said validating against said anomalous data detection model.

According to an exemplary aspect of the present invention, there is provided an apparatus for preparing a machine learning based malware detection, comprising a memory configured to store computer program code, and a processor configured to read and execute computer program code stored in the memory, wherein the processor is configured to cause the apparatus to perform analyzing a set of training data, said set of training data comprising a plurality of training data elements, wherein each of said plurality of training data elements is associated with a respective one of at least two maliciousness related properties, learning a malicious object detection model on the basis of first feature combinations of said plurality of training data elements, said first feature combinations characterizing each of said at least two maliciousness related properties, learning an anomalous data detection model on the basis of second feature combinations of said plurality of training data elements, said second feature combinations characterizing said set of training data, said anomalous data detection model being associated with said malicious object detection model, and providing said malicious object detection model and said anomalous data detection model.

According to an exemplary aspect of the present invention, there is provided an apparatus for applying a machine learning based malware detection, comprising a memory configured to store computer program code, and a processor configured to read and execute computer program code stored in the memory, wherein the processor is configured to cause the apparatus to perform receiving a malicious object detection model and an anomalous data detection model, said malicious object detection model characterizing each of at least two maliciousness related properties, said anomalous data detection model being associated with said malicious object detection model and characterizing a set of training data for said malicious object detection model, receiving a maliciousness detection candidate, validating said maliciousness detection candidate against said malicious object detection model, validating said maliciousness detection candidate against said anomalous data detection model, and merging a result of said validating against said malicious object detection model and a result of said validating against said anomalous data detection model.

According to an exemplary aspect of the present invention, there is provided a non-transitory computer storage medium having stored thereon a computer program code for implementing the method according to any one of the aforementioned method-related exemplary aspects of the present invention.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects solve at least part of the problems and drawbacks identified in relation to the prior art. Further developments and/or modifications of the aforementioned example aspects of the present invention are set out herein with reference to the drawings and exemplifying embodiments of the present invention.

By way of exemplifying embodiments of the present invention, there is provided machine learning based malware detection systems. More specifically, by way of exemplary embodiments of the present invention, there are provided measures and mechanisms for realizing machine learning based malware detection systems.

Thus, improvement is achieved by methods, apparatuses and computer program products enabling/realizing machine learning based malware detection systems.

In particular, according to exemplary embodiments of the present invention, among others, it can be discovered when the model stops performing as desired, it can be discovered when an object is unsuitable for the model, those objects can be identified that need to be used to improve the model, and the overall performances of the predictive system can be improved

BRIEF DESCRIPTION OF THE DRAWINGS

In the following, the present invention will be described in greater detail by way of non-limiting examples with reference to the accompanying drawings, in which.

DETAILED DESCRIPTION OF DRAWINGS AND EMBODIMENTS OF THE PRESENT INVENTION

The present invention is described herein with reference to particular non-limiting examples and to what are presently considered to be conceivable embodiments of the present invention. A person skilled in the art will appreciate that the present invention is by no means limited to these examples, and may be more broadly applied.

Hereinafter, various exemplifying embodiments and implementations of the present invention and its aspects are described using several variants and/or alternatives. It is generally noted that, according to certain needs and constraints, all of the described variants and/or alternatives may be provided alone or in any conceivable combination (also including combinations of individual features of the various variants and/or alternatives). In this description, the words "comprising" and "including" should be understood as not limiting the described exemplifying embodiments and implementations to consist of only those features that have been mentioned, and such exemplifying embodiments and implementations may also contain features, structures, units, modules etc. that have not been specifically mentioned.

In the drawings, it is noted that lines/arrows interconnecting individual blocks or entities are generally meant to illustrate an operational coupling there-between, which may be a physical and/or logical coupling, which on the one hand is implementation-independent (e.g. wired or wireless) and on the other hand may also comprise an arbitrary number of intermediary functional blocks or entities not shown.

According to exemplifying embodiments of the present invention, in general terms, there are provided measures and mechanisms for (enabling/realizing) machine learning based malware detection systems.

According to exemplary embodiments of the present invention, the problems discussed above is addressed by distilling knowledge about the characteristics of the training set and by using this information to improve performances by coupling the predictive model with a second model that detects anomalies in the incoming flow of objects.

In particular, according to exemplary embodiments of the present invention, the flow of incoming objects is monitored to determine deviations in form or meaning from the training set that was used to build the model, it is distinguished between errors originating from the imperfect nature of a classification model and those due to problems with the dataset used for training, items that require inclusion in the training set are identified, and, as a result, the precision of the model is increased by leveraging the anomalous nature of incoming input objects.

Figure 4:
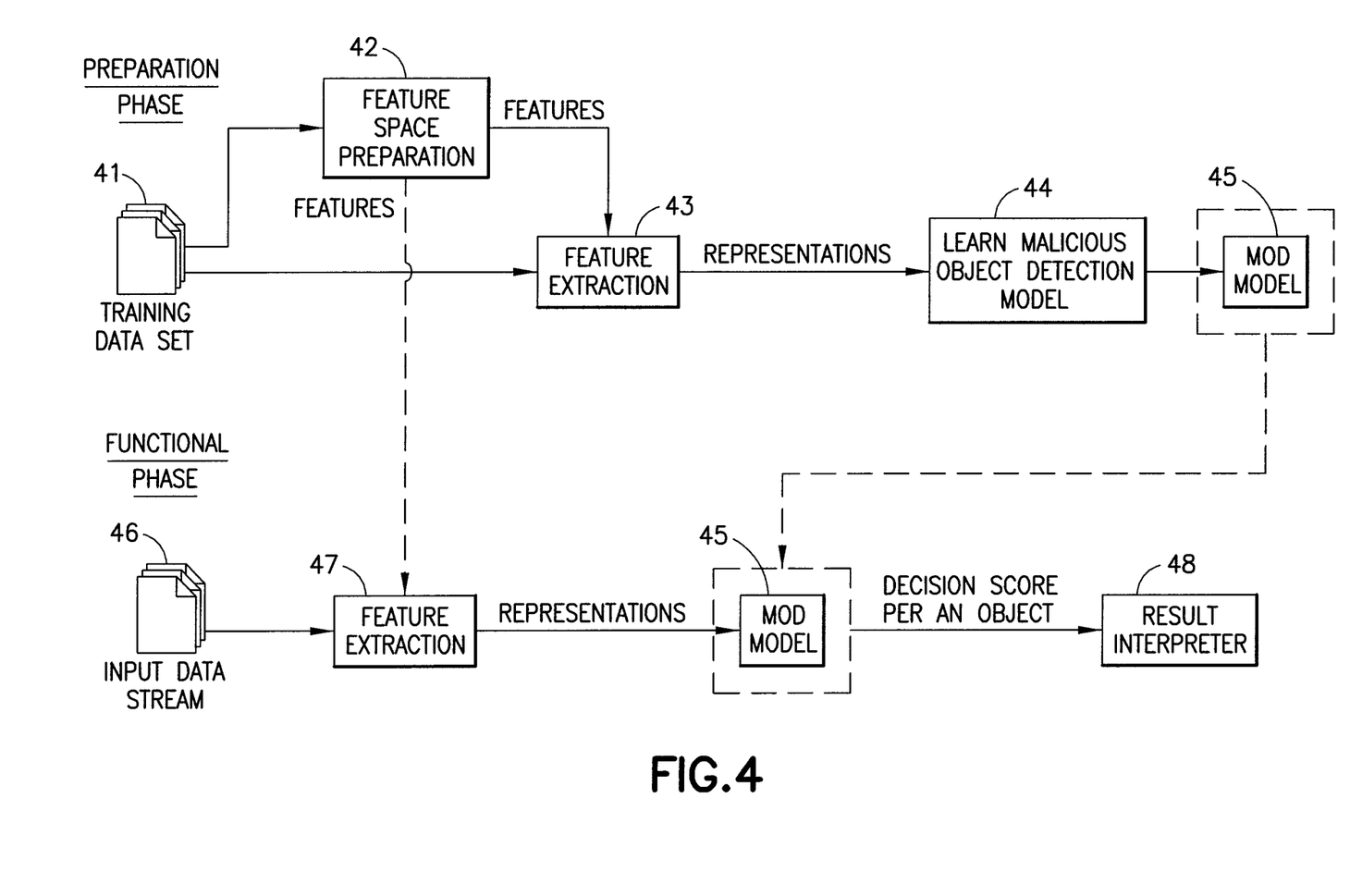
FIG. 4 is a schematic diagram illustrating principles of a machine learning based malware detection system.

FIG. 4 is a schematic diagram illustrating principles of a machine learning based malware detection system.

While FIG. 4 illustrate principles of a typical machine learning based malware detection system (and in particular a typical structure of a machine learning based malware detection system), it is noted that the present invention is applicable also to systems deviating from these typical systems.

Hence, the details given in relation to FIG. 4 and given for illustrative purposes and shall not be understood as limiting the present invention to the embodiments encompassed thereby.

As can be seen in FIG. 4, in relation to machine learning based malware detection systems, it can be distinguished between two critical lifecycle phases, namely the preparation phase and the functional phase.

The preparatory phase is used to produce a set of items that are critical for the functioning of the second ("functional") phase.

Namely, the set of features that are used to represent the particular object the classifier will have to work with, and decision model that leverages the representation of an object based on the above mentioned features to classify the objects it is fed.

During the preparatory phase, the training data (41) undergoes a preprocessing ("Feature space preparation" block 42) to find and select an appropriate set of features that can represent effectively the given data ("Feature extraction" block 43). Such features are then leveraged during the preparation of a decision model ("Learn model" block 44). After the conclusion of the preparatory phase both the feature definitions and the trained model (45) are used against incoming unknown input objects (46). Each object in the input flow of previously unseen items is mapped to the appropriate space as dictated by the selected features (47). Such representation of the input object is then fed to the trained model (45) and the prediction of the model is collected (48), alongside any further output for the model (e.g. confidence score(s)).

Figure 5:
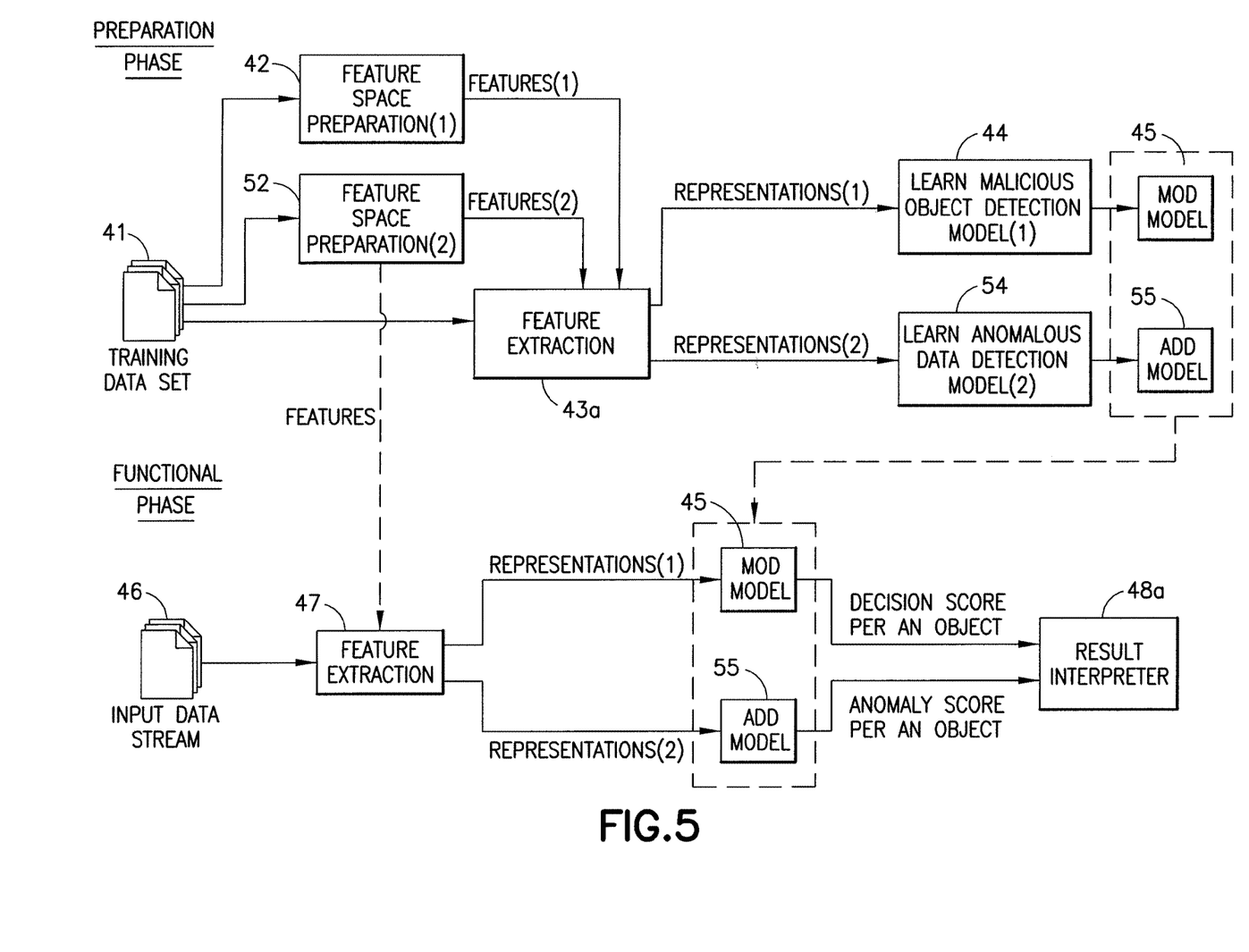
FIG. 5 is a schematic diagram illustrating principles of a machine learning based malware detection system according to exemplary embodiments of the present invention.

FIG. 5 is a schematic diagram illustrating principles of a machine learning based malware detection system according to exemplary embodiments of the present invention.

In particular, in FIG. 5, several extensions to the typical structure of a machine learning based malware detection system according to exemplary embodiments of the present invention are shown.

Namely, extensions according to exemplary embodiments of the present invention in contrast to the above described traditional model for machine learning based systems are derivable from FIG. 5.

In particular, according to exemplary embodiments of the present invention, a trained machine learning based model for "detection for malicious objects" (denoted as "MOD model") (45) is accompanied by a dedicated detection model for anomalies in data (denoted as "ADD detection model") (55).

Here, the MOD model (45) bears responsibility of (i.e. is used for) detecting malicious and/or suspicious objects. Further, the ADD model (55) bears responsibility of (i.e. is used for) validating the given object(s) (46) in terms of how these are similar to the ones belonging to the training set (41) that was used to prepare the associated MOD model (45).

Accordingly, each ADD model (55) supports the overall detection quality by highlighting when an input object (46) might not be suitable for its associated MOD model (45).

As can be seen in FIG. 5, the addition of the ADD model (55) introduces a new feature space preparation process (52). This is required to guarantee that the ADD model (55) is also following best practices and the standard lifecycle model. The significant difference in purposes between the MOD model (45) and the ADD model (55) can justify the distinct nature of the features used by the two models.

The first type of model ("MOD") (45) uses features reflecting the presence or absence of inherent properties for the target classes (for example, according to exemplary embodiments of the present invention, the classes are "malware" and "clean") of the objects present in the training set (41). In more generic terms, the features (features combinations) corresponding to the MOD model characterize maliciousness.

The second type of model ("ADD") (55) focuses on a generalization of the intrinsic properties of the whole training set (41). In more generic terms, the features (features combinations) corresponding to the ADD model characterize the training set.

The distinction between the MOD model and the ADD model depends on the particular nature of the problem at hand and may differ from the above-mentioned distinction on a case-by-case basis. In other words, the above-mentioned distinction is not mandatory.

The above-discussed principles of the present invention are described in the following with reference to FIGS. 1 and 2.

Figure 1:
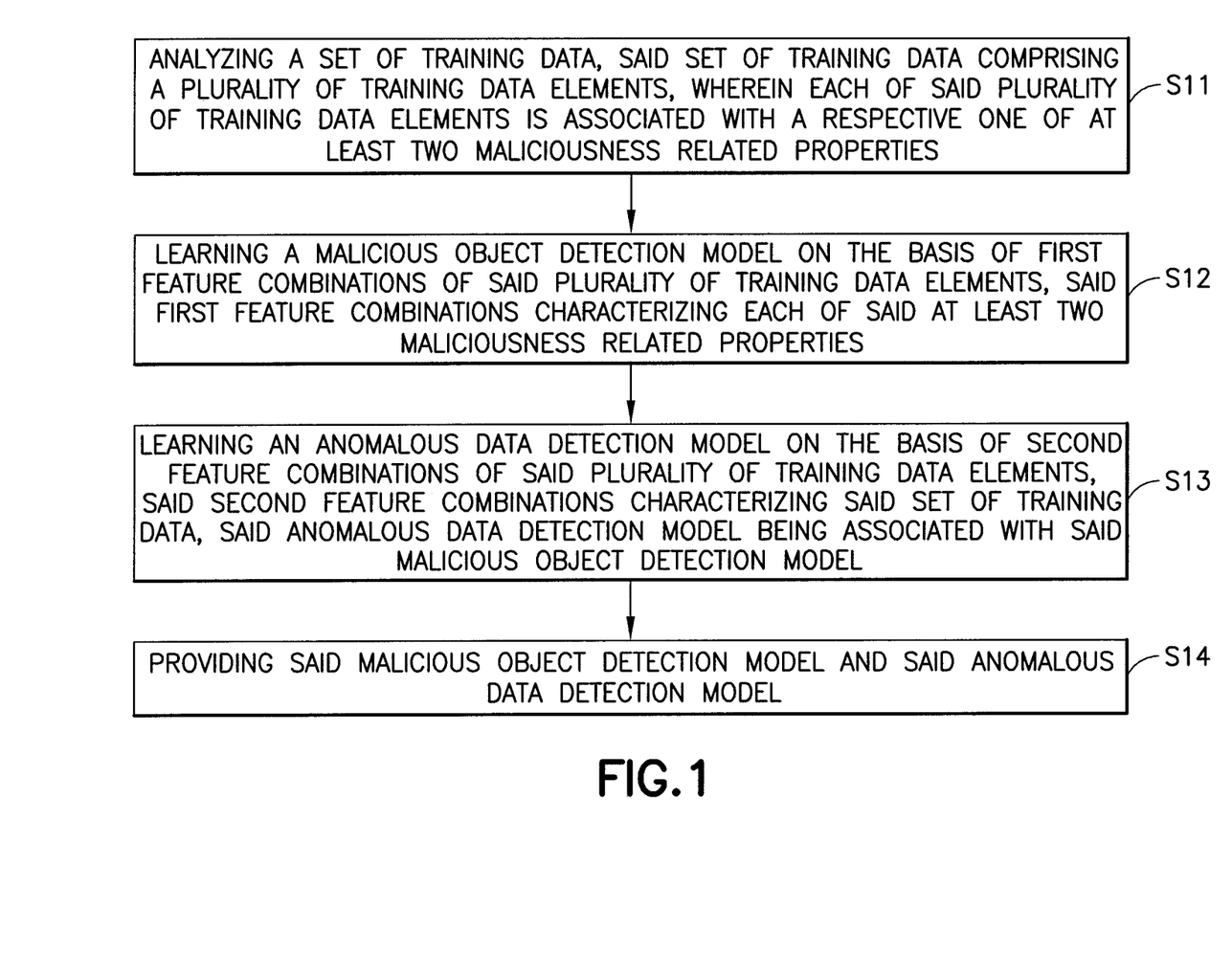
FIG. 1 is a schematic diagram of a procedure according to exemplary embodiments of the present invention.

FIG. 1 is a schematic diagram of a procedure according to exemplary embodiments of the present invention.

As shown in FIG. 1, a procedure of preparing a machine learning based malware detection (i.e., related to the above-mentioned preparation phase), for example, a procedure of preparing a machine learning based malware detection system, according to exemplary embodiments of the present invention comprises an operation of analyzing (S11) a set of training data, said set of training data comprising a plurality of training data elements, wherein each of said plurality of training data elements is associated with a respective one of at least two maliciousness related properties, an operation of learning (S12) a malicious object detection model on the basis of first feature combinations of said plurality of training data elements, said first feature combinations characterizing each of said at least two maliciousness related properties, an operation of learning (S13) an anomalous data detection model on the basis of second feature combinations of said plurality of training data elements, said second feature combinations characterizing said set of training data, said anomalous data detection model being associated with said malicious object detection model, and an operation of providing (S14) said malicious object detection model and said anomalous data detection model.

Here, it is noted that (some of the) feature combinations which are used for learning the malicious object detection model may also be useful for learning the anomalous data detection model, such that the first feature combinations overlap with the second feature combinations. Namely, a certain characteristic which is useful for distinguishing between objects may also be useful for determining an anomalous situation (e.g. in which the used malicious object detection model does not fit a maliciousness detection candidate or the maliciousness detection candidate does not fit the training set). In other words, according to the present invention, feature combinations used for the learning (S12) of the malicious object detection model are not excluded from being used for the learning (S13) of the anomalous data detection model.

Accordingly, according to exemplary embodiments of the present invention, at least one feature combination out of said first feature combinations of said plurality of training data elements correspond to at least one feature combination out of said second feature combinations of said plurality of training data elements.

Nevertheless, according to further exemplary embodiments of the present invention, the first feature combinations do not overlap with the second feature combinations.

According to a variation of the procedure shown in FIG. 1, exemplary details of the analyzing operation (S11) and exemplary additional operations are given, which are inherently independent from each other as such.

Such analyzing operation (S11) according to exemplary embodiments of the present invention may comprise an operation of determining a first feature space representing said set of training data, and an operation of mapping each of said plurality of training data elements to said first feature space. Here, it is noted that said malicious object detection model is learned (S12) on the basis of said plurality of training data elements respectively mapped to said first feature space.

Further, according to such variation, an exemplary method according to exemplary embodiments of the present invention may comprise an operation of providing said first feature space.

According to a variation of the procedure shown in FIG. 1, exemplary details of the analyzing operation (S11) and exemplary additional operations are given, which are inherently independent from each other as such.

Such analyzing operation (S11) according to exemplary embodiments of the present invention may comprise an operation of determining a second feature space representing said set of training data, and an operation of mapping each of said plurality of training data elements to said second feature space. Here, it is noted that said anomalous data detection model is learned (S13) on the basis of said plurality of training data elements respectively mapped to said second feature space.

Further, according to such variation, an exemplary method according to exemplary embodiments of the present invention may comprise an operation of providing said second feature space.

According to further exemplary embodiments of the present invention, said at least two maliciousness related properties include a classification as malicious and a classification as clean, and said malicious object detection model is adapted for classification of a maliciousness detection candidate as one of said at least two maliciousness related properties.

According to still further exemplary embodiments of the present invention, said anomalous data detection model is adapted for validation of a maliciousness detection candidate regarding deviation from said set of training data.

According to a variation of the procedure shown in FIG. 1, exemplary additional operations are given, which are inherently independent from each other as such.

According to such variation, an exemplary method according to exemplary embodiments of the present invention may comprise an operation of receiving information indicative of said maliciousness detection candidate that is determined as deviating from said set of training data by more than a predetermined threshold, and an operation of incorporating said maliciousness detection candidate into said set of training data.

Namely, the evolution of incoming data (to be subjected to the maliciousness detection) provides a productive opportunity to automatically adjust/evolve the training set contents (i.e. the set of training data) to the reality. By incorporating these deviating maliciousness detection candidates into the training set contents, further "generations" of the malware detection system will have knowledge (at least consider to some extent) these items.

According to a variation of the procedure shown in FIG. 1, exemplary additional operations are given, which are inherently independent from each other as such.

According to such variation, an exemplary method according to exemplary embodiments of the present invention may comprise an operation of receiving information indicative of a number of occurrences of maliciousness detection candidates determined as deviating from said set of training data by more than a predetermined threshold and/or information indicative of a percentage of maliciousness detection candidates determined as deviating from said set of training data by more than a predetermined threshold in maliciousness detection candidates corresponding to a predetermined period of time, and an operation of deciding, based on said information indicative of said number and/or said information indicative of said percentage, on an action in relation to said malicious object detection model.

According to exemplary embodiments of the present invention, the action in relation to said malicious object detection model may include at least one of an operation of dropping said malicious object detection model, an operation of updating said malicious object detection model, and an operation of modifying said malicious object detection model.

In other words, according to exemplary embodiments, on the basis of feedback (preferably from the functional phase, i.e. an application of a machine learning based malware detection), it can be decided whether the malicious object detection model stops being effective due to e.g. evolution of the incoming data. Based on a determination that the malicious object detection has stopped being effective, the model may be discarded (i.e. dropped), may be re-learned e.g. based on the evolved incoming data (i.e. updated), or may be modified in other forms.

Figure 2:
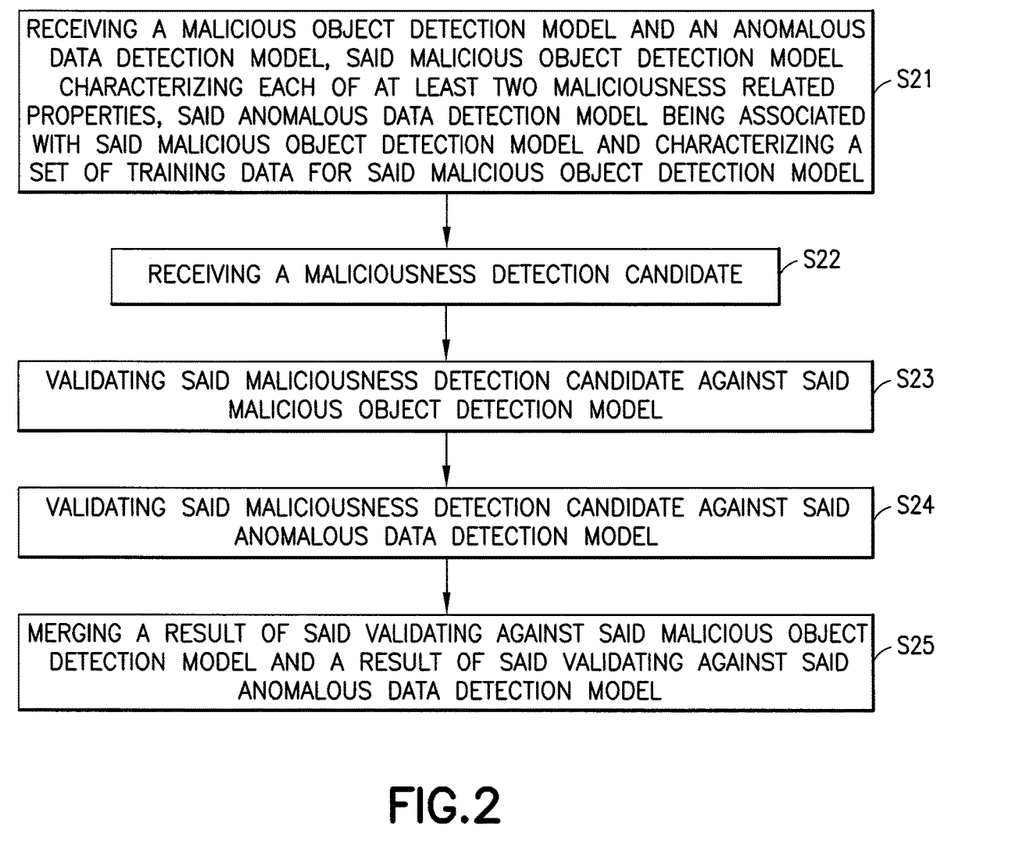
FIG. 2 is a schematic diagram of a procedure according to exemplary embodiments of the present invention.

FIG. 2 is a schematic diagram of a procedure according to exemplary embodiments of the present invention.

As shown in FIG. 2, a procedure of applying a machine learning based malware detection (i.e., related to the above-mentioned functional phase), for example, a procedure of applying a machine learning based malware detection system, according to exemplary embodiments of the present invention comprises an operation of receiving (S21) a malicious object detection model and an anomalous data detection model, said malicious object detection model characterizing each of at least two maliciousness related properties, said anomalous data detection model being associated with said malicious object detection model and characterizing a set of training data for said malicious object detection model, an operation of receiving (S22) a maliciousness detection candidate, an operation of validating (S23) said maliciousness detection candidate against said malicious object detection model, an operation of validating (S24) said maliciousness detection candidate against said anomalous data detection model, and an operation of merging (S25) a result of said validating against said malicious object detection model and a result of said validating against said anomalous data detection model.

According to a variation of the procedure shown in FIG. 2, exemplary additional operations are given, which are inherently independent from each other as such.

According to such variation, an exemplary method according to exemplary embodiments of the present invention may comprise an operation of receiving a first feature space representing said set of training data, and an operation of mapping said maliciousness detection candidate to said first feature space. In this regard, it is noted that said maliciousness detection candidate mapped to said first feature space is validated (S23) against said malicious object detection model.

According to a variation of the procedure shown in FIG. 2, exemplary additional operations are given, which are inherently independent from each other as such.

According to such variation, an exemplary method according to exemplary embodiments of the present invention may comprise an operation of receiving a second feature space representing said set of training data, and an operation of mapping said maliciousness detection candidate to said second feature space. Here, it is noted that said maliciousness detection candidate mapped to said second feature space is validated (S24) against said anomalous data detection model.

According to further exemplary embodiments of the present invention, said at least two maliciousness related properties include a classification as malicious and a classification as clean, and said malicious object detection model is adapted for classification of said maliciousness detection candidate as one of said at least two maliciousness related properties.

According to still further exemplary embodiments of the present invention, said anomalous data detection model is adapted for validation of said maliciousness detection candidate regarding deviation from said set of training data.

According to a variation of the procedure shown in FIG. 2, exemplary additional conditional operations are given, which are inherently independent from each other as such.

According to such variation, an exemplary method according to exemplary embodiments of the present invention may comprise, if said maliciousness detection candidate is determined as deviating from said set of training data by more than a predetermined threshold on the basis of said anomalous data detection model, an operation of considering a result of said validating (S23) said maliciousness detection candidate against said malicious object detection model as not reliable, and/or an operation of transmitting information indicative of said maliciousness detection candidate that is determined as deviating from said set of training data by more than a predetermined threshold.

According to a variation of the procedure shown in FIG. 2, exemplary additional operations are given, which are inherently independent from each other as such.

According to such variation, an exemplary method according to exemplary embodiments of the present invention may comprise an operation of calculating a deviation percentage of maliciousness detection candidates determined as deviating from said set of training data by more than a predetermined threshold in maliciousness detection candidates received within a predetermined period of time, and an operation of transmitting information indicative of said deviation percentage.

In other words, according to exemplary embodiments, a feedback may be prepared on the basis of occurrences of deviating maliciousness detection candidates. This may be fed back (preferably to the preparation phase, i.e. a preparation of a machine learning based malware detection), where it can be used e.g. to decide whether the malicious object detection model stops being effective due to e.g. evolution of the incoming data.

Namely, a challenge of machine learning-based models is that it is difficult to recognize when the model becomes useless or at least less effective. Such situation may occur for example in case of a sudden change in input data which may raise continuously output of unreliable estimations. Hence, according to exemplary embodiments of the present invention, the percentage of anomalous input objects in the input stream is count over a certain period of time, and this information may afterwards be used to decide on the further fate of the malicious object detection model.

According to a further variation of the procedure shown in FIG. 2, exemplary additional operations are given, which are inherently independent from each other as such.

Namely in addition to the above variation, or as an alternative thereto, an exemplary method according to exemplary embodiments of the present invention may comprise an operation of incrementing a deviation counter indicative of a number of occurrences of maliciousness detection candidates determined as deviating from said set of training data by more than a predetermined threshold, and an operation of transmitting information indicative of said deviation counter.

The above-discussed exemplary embodiments of the present invention are described in more detail below on the basis of a concrete example. It is noted that this example is given for illustration purposes, and the present invention is not limited to such example.

Figure 6:
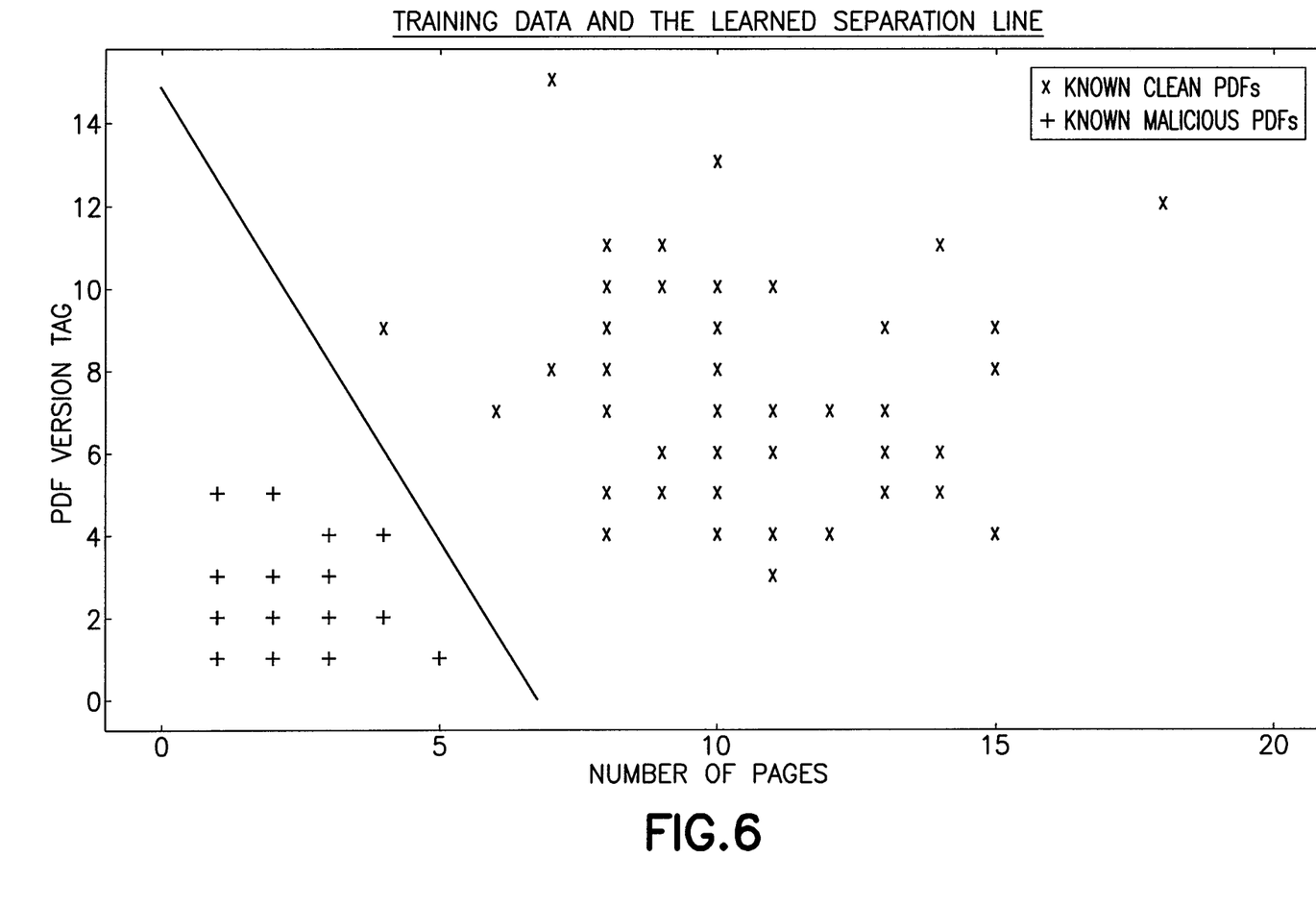
FIG. 6 shows a schematic diagram illustrating representations of trained data and a trained model according to exemplary embodiments of the present invention.
Figure 7:
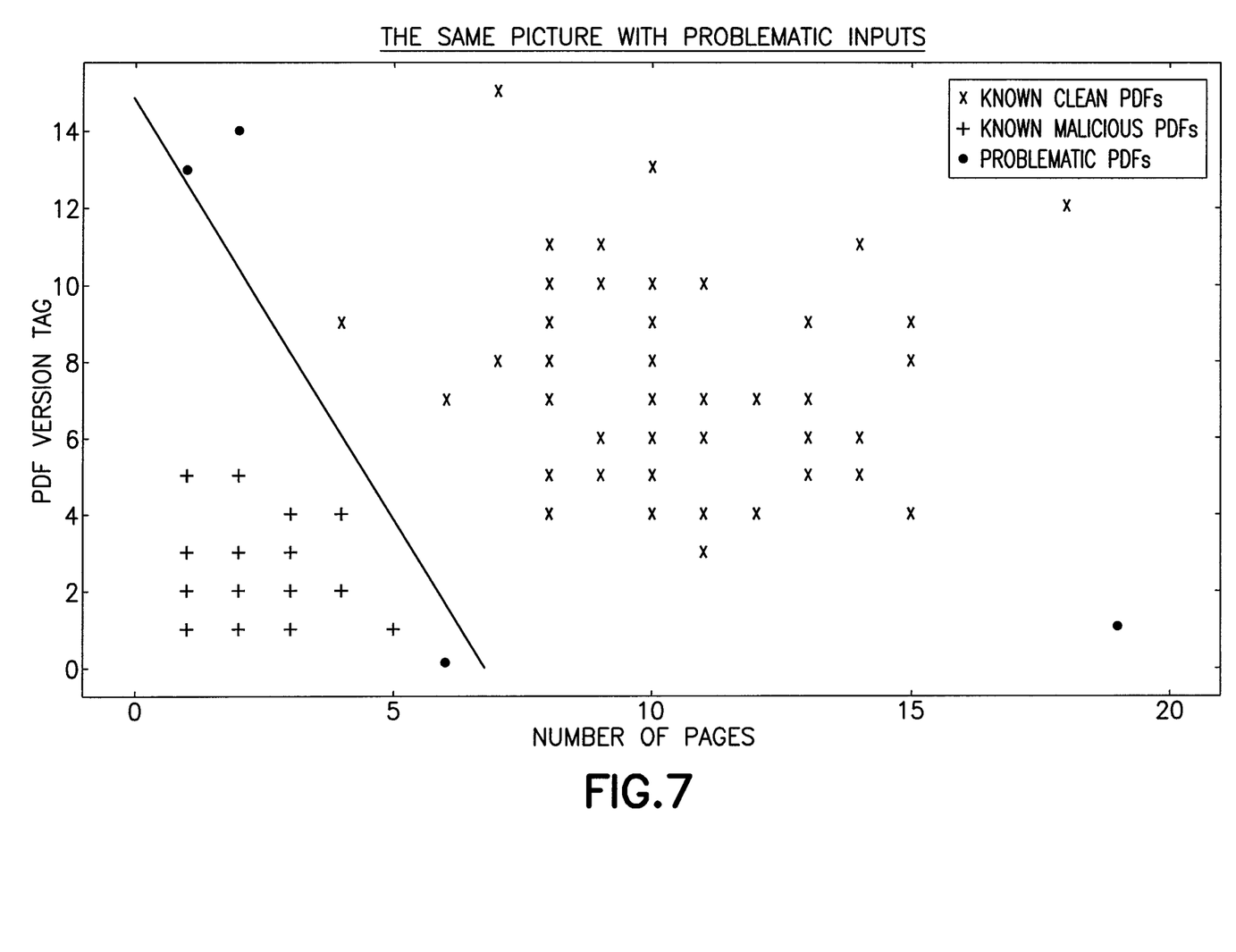
FIG. 7 shows a schematic diagram illustrating representations of trained data, checked data, and a trained model according to exemplary embodiments of the present invention.
Figure 8:
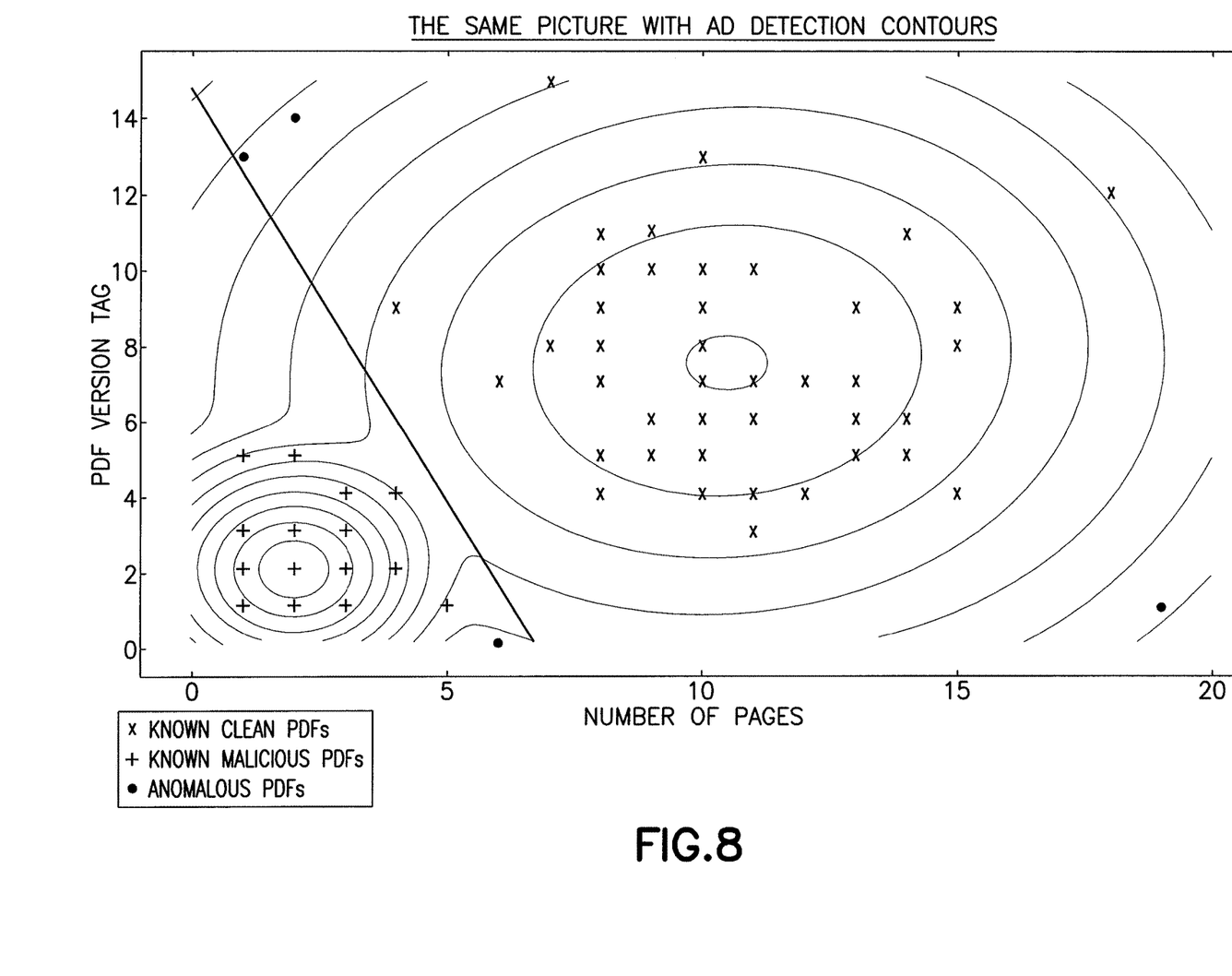
FIG. 8 shows a schematic diagram illustrating representations of trained data, checked data, and trained models according to exemplary embodiments of the present invention.

The illustrative example is explained in particular with reference to FIGS. 6, 7 and 8.

The following scenario is considered as a basis for the illustrative example, although this scenario might not capture all the complexity of a real world situation.

According to this scenario, a labelled set of portable document format (PDF) documents is prepared (e.g. manually by an analyst). Based on this collection, an appropriate decision model is prepared (e.g. by passing the collection to a data analyst).

The purpose of the decision model is to assign labels to new previously unseen PDF documents, wherein labels could e.g. be "malicious" and "clean".

During the initial analysis it is discovered (e.g. by the data scientist) that it is possible to build a simple and reliable linear decision model that distinguishes between the two classes described above. The linear decision model represented by the straight line in the diagram of FIG. 6 is able to assign the "malicious" and "clean" labels.

Particularly, the model is able to assign these labels by using just two particular features, as is derivable from the diagram of FIG. 6, namely the number of pages in the document and its version tag.

The model is then built, tested and deployed to a production environment. The structure of the training set once it is mapped in the selected bi-dimensional space is shown in FIG. 6.

Over time, as the model is used to predict the label for incoming PDF files, problematic cases arise (e.g. the analyst is occasionally presented with such problematic cases), that are either false positives (FP) or false negatives (FN).

Two main reasons for these kinds of errors were identified.

On the one hand, a first reason is the model itself, which is failing to distinguish between the various classes, for example because the trained model happens to overfit or underfit the used training data.

On the other hand, a second reason is that the training set fails to capture the natural evolution of the objects that it attempts to model.

It is the second reason which is mainly addressed by the present invention and in particular by the exemplary embodiments of the present invention.

Usually, these kinds of problems are observed in the lifecycle of a machine learning based classification system when new objects cannot be assigned correctly to a class with a high enough level of confidence, or when these documents are assigned to wrong classes.

Examples of such problematic cases are represented in FIG. 7 as (areal) dots, wherein the dot left of the straight line represents a false positive, while the dots right of the straight line represent respective false negatives.

It is self-evident that such situation is undesirable, since thus additional effort to continuously address (correct) mistakes made by the system (e.g. by the analyst). Further, the confidence (e.g. of personnel) towards machine learning based systems would be lowered.

FIG. 8 illustrates the model known from FIG. 6 (i.e., the linear decision model represented by the straight line) accompanied by a dedicated anomalous data detection model represented by concentric shapes.

In particular, in FIG. 8, the result of associating the PDF classification model (straight line) described in this example with a dedicated anomalous data detection model (concentric shapes/contours). The contours of the anomalous data detection model represent the levels of negative log-likelihood outputs of a Gaussian Mixture—based anomaly detection model that was obtained by training with the same training data. In simplified terms, these contours make a statement with respect to where (i.e. in which areas) of the respective regions dedicated to the two classes many training data were present (such that these areas do have higher reliability) and where (i.e. in which areas) of the respective regions dedicated to the two classes less training data were present (such that these areas do have lower reliability).

As can be seen from the diagram of FIG. 8, the problematic PDF objects (indicated by the dots) clearly have higher scores from the ADD detection model than the samples belonging to the training set. This indicates their potential incompatibility with the existing learned MOD detection model.

Conclusions in view of results/outputs of the two models (MOD detection model, ADD detection model) according to exemplary embodiments addressing the explained example can be derived from the tuples represented by the table below.

| MOD detection model output | ADD detection model output | Suggestion/Conclusion |
| --- | --- | --- |
| "Malware" | "Not anomalous" | Malware |
| "Clean" | "Not anomalous" | Clean |
| "Malware" | "Anomalous" | Potential false positive: Check and move to the new training set |
| "Clean" | "Anomalous" | Potential false negative: Check and move to the new training set |

The above-described procedures and functions may be implemented by respective functional elements, entities, modules, units, processors, or the like, as described below.

While in the foregoing exemplifying embodiments of the present invention are described mainly with reference to methods, procedures and functions, corresponding exemplifying embodiments of the present invention also cover respective apparatuses, entities, modules, units, nodes and systems, including both software and/or hardware thereof.

Respective exemplifying embodiments of the present invention are described below referring to FIG. 3, while for the sake of brevity reference is made to the detailed description of respective corresponding configurations/setups, schemes, methods and functionality, principles and operations according to FIGS. 1, 2 and 4 to 8.

Figure 3:
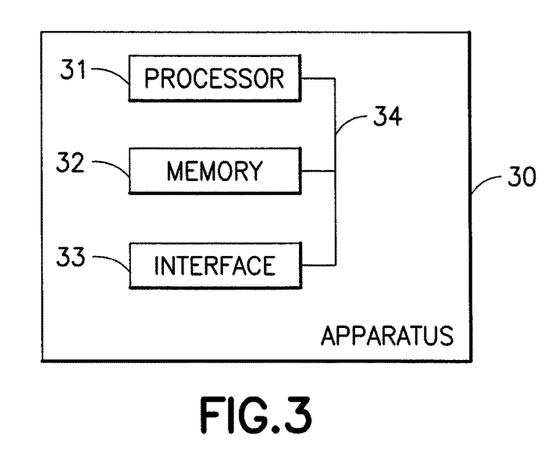
FIG. 3 is a block diagram illustrating an apparatus according to exemplary embodiments of the present invention.

In FIG. 3, the solid line blocks are basically configured to perform respective methods, procedures and/or functions as described above. The entirety of solid line blocks are basically configured to perform the methods, procedures and/or functions as described above, respectively. With respect to FIG. 3, it is to be noted that the individual blocks are meant to illustrate respective functional blocks implementing a respective function, process or procedure, respectively. Such functional blocks are implementation-independent, i.e. may be implemented by means of any kind of hardware or software or combination thereof, respectively.

Further, in FIG. 3, only those functional blocks are illustrated, which relate to any one of the above-described methods, procedures and/or functions. A skilled person will acknowledge the presence of any other conventional functional blocks required for an operation of respective structural arrangements, such as e.g. a power supply, a central processing unit, respective memories, a display, or the like. Among others, one or more memories are provided for storing programs or program instructions for controlling or enabling the individual functional entities or any combination thereof to operate as described herein in relation to exemplifying embodiments.

In general terms, respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

In view of the above, the thus illustrated devices/apparatuses are suitable for use in practicing one or more of the exemplifying embodiments of the present invention, as described herein.

In particular, the apparatus according to FIG. 3 may perform the method of FIGS. 1 and/or 2 but is not limited to this method. The method of FIGS. 1 and/or 2 may be performed by the apparatus of FIG. 3 but is not limited to being performed by this apparatus.

Hence, FIG. 3 shows a schematic diagram illustrating an example of a structure of an apparatus according to exemplifying embodiments of the present invention.

As indicated in FIG. 3, an apparatus 30 according to exemplifying embodiments of the present invention may comprise at least one processor 31 and at least one memory 32 (and possibly also at least one interface 33), which may be operationally connected or coupled, for example by a bus 34 or the like, respectively.

The processor 31 of the apparatus 30 is configured to read and execute computer program code stored in the memory 32. The processor may be represented by a CPU (Central Processing Unit), a MPU (Micro Processor Unit), etc, or a combination thereof. The memory 32 of the apparatus 30 is configured to store computer program code, such as respective programs, computer/processor-executable instructions, macros or applets, etc. or parts of them. Such computer program code, when executed by the processor 31, enables the apparatus 30 to operate in accordance with exemplifying embodiments of the present invention. The memory 32 may be represented by a RAM (Random Access Memory), a ROM (Read Only Memory), a hard disk, a secondary storage device, etc., or a combination of two or more of these. The interface 33 of the apparatus 30 is configured to interface with another apparatus and/or a user of the apparatus 30. That is, the interface 33 may represent a communication interface (including e.g. a modem, an antenna, a transmitter, a receiver, a transceiver, or the like) and/or a user interface (such as a display, touch screen, keyboard, mouse, signal light, loudspeaker, or the like).

The apparatus 30 may, for example, represent a (part of a) a machine learning based malware detection system, and may, as such, address/represent the above-mentioned preparation functionality and the above-mentioned application (functional) functionality.

When representing the preparation functionality, the apparatus 30 or its processor 31 (possibly together with computer program code stored in the memory 32), in its most basic form, is configured to analyze a set of training data, said set of training data comprising a plurality of training data elements, wherein each of said plurality of training data elements is associated with a respective one of at least two maliciousness related properties, to learn a malicious object detection model on the basis of first feature combinations of said plurality of training data elements, said first feature combinations characterizing each of said at least two maliciousness related properties, to learn an anomalous data detection model on the basis of second feature combinations of said plurality of training data elements, said second feature combinations characterizing said set of training data, said anomalous data detection model being associated with said malicious object detection model, and to provide said malicious object detection model and said anomalous data detection model.

When representing the application (functional) functionality, the apparatus 30 or its processor 31 (possibly together with computer program code stored in the memory 32), in its most basic form, is configured to receive a malicious object detection model and an anomalous data detection model, said malicious object detection model characterizing each of at least two maliciousness related properties, said anomalous data detection model being associated with said malicious object detection model and characterizing a set of training data for said malicious object detection model, to receive a maliciousness detection candidate, to validate said maliciousness detection candidate against said malicious object detection model, to validate said maliciousness detection candidate against said anomalous data detection model, and to merge a result of said validating against said malicious object detection model and a result of said validating against said anomalous data detection model.

Accordingly, any one of the above-described schemes, methods, procedures, principles and operations may be realized in a computer-implemented manner.

Any apparatus according to exemplifying embodiments of the present invention may be structured by comprising respective units or means for performing corresponding operations, procedures and/or functions. For example, such means may be implemented/realized on the basis of an apparatus structure, as exemplified in FIG. 3 above, i.e. by one or more processors 31, one or more memories 32, one or more interfaces 33, or any combination thereof.

An apparatus according to exemplifying embodiments of the present invention, which represents the preparation functionality, may comprise (at least) a unit or means for analyzing a set of training data, said set of training data comprising a plurality of training data elements, wherein each of said plurality of training data elements is associated with a respective one of at least two maliciousness related properties, (at least) a unit or means for learning a malicious object detection model on the basis of first feature combinations of said plurality of training data elements, said first feature combinations characterizing each of said at least two maliciousness related properties, (at least) a unit or means for learning an anomalous data detection model on the basis of second feature combinations of said plurality of training data elements, said second feature combinations characterizing said set of training data, said anomalous data detection model being associated with said malicious object detection model, and (at least) a unit or means for providing said malicious object detection model and said anomalous data detection model.

An apparatus according to exemplifying embodiments of the present invention, which represents the application (functional) functionality, may comprise (at least) a unit or means for receiving a malicious object detection model and an anomalous data detection model, said malicious object detection model characterizing each of at least two maliciousness related properties, said anomalous data detection model being associated with said malicious object detection model and characterizing a set of training data for said malicious object detection model, (at least) a unit or means for receiving a maliciousness detection candidate, (at least) a unit or means for validating said maliciousness detection candidate against said malicious object detection model, (at least) a unit or means for validating said maliciousness detection candidate against said anomalous data detection model, and (at least) a unit or means for merging a result of said validating against said malicious object detection model and a result of said validating against said anomalous data detection model.

For further details regarding the operability/functionality of the individual elements according to exemplifying embodiments of the present invention, reference is made to the above description in connection with any one of FIGS. 1, 2 and 4 to 8, respectively.

According to exemplifying embodiments of the present invention, any one of the processor, the memory and the interface may be implemented as individual modules, chips, chipsets, circuitries or the like, or one or more of them can be implemented as a common module, chip, chipset, circuitry or the like, respectively.

According to exemplifying embodiments of the present invention, a system may comprise any conceivable combination of the thus depicted devices/apparatuses and other network elements, which are configured to cooperate as described above.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Such software may be software code independent and can be specified using any known or future developed programming language, such as e.g. Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Apparatuses and/or units, means or parts thereof can be implemented as individual devices, but this does not exclude that they may be implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible or non-transitory medium such as a computer-readable (storage) medium having stored thereon a respective data structure or code means/portions or embodied in a signal or in a chip, potentially during processing thereof. A computer program product encompasses a computer memory encoded with executable instructions representing a computer program for operating/driving a computer connected to a network.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for machine learning based malware detection systems. Such measures exemplarily comprise analyzing a set of training data, said set of training data comprising a plurality of training data elements, wherein each of said plurality of training data elements is associated with a respective one of at least two maliciousness related properties, learning a malicious object detection model on the basis of first feature combinations of said plurality of training data elements, said first feature combinations characterizing each of said at least two maliciousness related properties, learning an anomalous data detection model on the basis of second feature combinations of said plurality of training data elements, said second feature combinations characterizing said set of training data, said anomalous data detection model being associated with said malicious object detection model, and providing said malicious object detection model and said anomalous data detection model.

Even though the invention is described above with reference to the examples and exemplifying embodiments with reference to the accompanying drawings, it is to be understood that the present invention is not restricted thereto. Rather, it is apparent to those skilled in the art that the above description of examples and exemplifying embodiments is for illustrative purposes and is to be considered to be exemplary and non-limiting in all respects, and the present invention can be modified in many ways without departing from the scope of the inventive idea as disclosed herein.

LIST OF ACRONYMS AND ABBREVIATIONS

ADD anomalies in data detection
FN false negative
FP false positive
IaaS infrastructure as a service
MOD malicious objects detection
PDF portable document format

The invention claimed is:

1. A method, comprising:
preparing a machine learning based malware detection system, comprising:
analyzing a set of training data, said set of training data comprising a plurality of training data elements, wherein the said plurality of training data elements comprises more than one feature space, wherein each of said plurality of training data elements is associated with a respective one of at least two maliciousness related properties, and wherein the at least two maliciousness related properties comprises a classification as malicious or a classification as clean;
adapting a malicious object detection model based on first feature combinations of the more than one feature space of said plurality of training data elements, said first feature combinations characterizing each of said at least two maliciousness related properties, wherein said malicious object detection model is adapted for classification of a maliciousness detection candidate as one of said at least two maliciousness related properties;
adapting an anomalous data detection model based on second feature combinations of the more than one feature space of said plurality of training data elements, said second feature combinations characterizing said set of training data, said anomalous data detection model being associated with said malicious object detection model, wherein said anomalous data detection model is adapted for validation of the maliciousness detection candidate based at least on a deviation from said set of training data; and
providing said malicious object detection model and said anomalous data detection model for use with the malicious detection candidate.

2. The method according to claim 1, wherein
in relation to said analyzing, said method further comprises
determining a first feature space representing said set of training data, and
mapping each of said plurality of training data elements to said first feature space, wherein
said malicious object detection model is learned on the basis of said plurality of training data elements respectively mapped to said first feature space, and
the method further comprises
providing said first feature space.

3. The method according to claim 1, wherein
in relation to said analyzing, said method further comprises
determining a second feature space representing said set of training data, and
mapping each of said plurality of training data elements to said second feature space, wherein
said anomalous data detection model is learned on the basis of said plurality of training data elements respectively mapped to said second feature space, and
the method further comprises
providing said second feature space.

4. The method according to claim 1, wherein
at least one feature combination out of said first feature combinations of said plurality of training data elements correspond to at least one feature combination out of said second feature combinations of said plurality of training data elements.

5. The method according to claim 1, wherein
said malicious object detection model is adapted for classification of the maliciousness detection candidate as one of said at least two maliciousness related properties.

6. The method according to claim 1, further comprising:
receiving information indicative of said maliciousness detection candidate that is determined as deviating from said set of training data by more than a predetermined threshold; and
incorporating said maliciousness detection candidate into said set of training data.

7. The method according to claim 1, further comprising:
receiving information indicative of a number of occurrences of maliciousness detection candidates determined as deviating from said set of training data by more than a predetermined threshold and/or information indicative of a percentage of maliciousness detection candidates determined as deviating from said set of training data by more than a predetermined threshold in maliciousness detection candidates corresponding to a predetermined period of time; and
deciding, based on said information indicative of said number and/or said information indicative of said percentage, on an action in relation to said malicious object detection model, wherein
said action in relation to said malicious object detection model includes at least one of
dropping said malicious object detection model,
updating said malicious object detection model, and
modifying said malicious object detection model.

8. A method, comprising:
applying a machine learning based malware detection system, comprising:
receiving a malicious object detection model and an anomalous data detection model, said malicious object detection model characterizing each of at least two maliciousness related properties, wherein the at least two maliciousness related properties comprises a classification as malicious or a classification as clean, wherein said malicious object detection model is adapted based on feature combinations of more than one feature space of training data elements for classification of a maliciousness detection candidate as one of said at least two maliciousness related properties, and wherein said anomalous data detection model being associated with said malicious object detection model and characterizing a set of training data for said malicious object detection model, wherein said anomalous data detection model is adapted for validation of the maliciousness detection candidate regarding deviation from said set of training data;
receiving the maliciousness detection candidate;
validating said maliciousness detection candidate against said malicious object detection model;
validating said maliciousness detection candidate against said anomalous data detection model; and
merging a result of said validating against said malicious object detection model and a result of said validating against said anomalous data detection model for use with the malicious detection candidate.

9. The method according to claim 8, further comprising:
receiving a first feature space representing said set of training data; and
mapping said maliciousness detection candidate to said first feature space, wherein said maliciousness detection candidate mapped to said first feature space is validated against said malicious object detection model.

10. The method according to claim 8, further comprising:
receiving a second feature space representing said set of training data; and
mapping said maliciousness detection candidate to said second feature space, wherein
said maliciousness detection candidate mapped to said second feature space is validated against said anomalous data detection model.

11. The method according to claim 8, wherein if said maliciousness detection candidate is determined as deviating from said set of training data by more than a predetermined threshold on the basis of said anomalous data detection model, said method further comprises
considering a result of said validating said maliciousness detection candidate against said malicious object detection model as not reliable, and/or
transmitting information indicative of said maliciousness detection candidate that is determined as deviating from said set of training data by more than a predetermined threshold.

12. The method according to claim 11, further comprising:
incrementing a deviation counter indicative of a number of occurrences of maliciousness detection candidates determined as deviating from said set of training data by more than a predetermined threshold; and
transmitting information indicative of said deviation counter.

13. The method according to claim 11, further comprising:
calculating a deviation percentage of maliciousness detection candidates determined as deviating from said set of training data by more than a predetermined threshold in maliciousness detection candidates received within a predetermined period of time; and
transmitting information indicative of said deviation percentage.

14. An apparatus, comprising:
a memory configured to store computer program code, and
a processor configured to read and execute computer program code stored in the memory,
wherein the processor is configured to cause the apparatus to perform:
preparing a machine learning based malware detection system, comprising:
analyzing a set of training data, said set of training data comprising a plurality of training data elements, wherein the said plurality of training data elements comprises more than one feature space, wherein each of said plurality of training data elements is associated with a respective one of at least two maliciousness related properties, wherein the at least two maliciousness related properties comprises a classification as malicious or a classification as clean;
adapting a malicious object detection model on the basis of based on first feature combinations of the more than one feature space of said plurality of training data elements, said first feature combinations characterizing each of said at least two maliciousness related properties, wherein said malicious object detection model is adapted for classification of a maliciousness detection candidate as one of said at least two maliciousness related properties;

adapting an anomalous data detection model based on second feature combinations of the more than one feature space of said plurality of training data elements, said second feature combinations characterizing said set of training data, said anomalous data detection model being associated with said malicious object detection model, wherein said anomalous data detection model is adapted for validation of the maliciousness detection candidate regarding deviation from said set of training data; and
providing said malicious object detection model and said anomalous data detection model for use with the malicious detection candidate.

15. The apparatus according to claim 14, wherein said anomalous data detection model is adapted for validation of the maliciousness detection candidate regarding the deviation from said set of training data, and
the processor is further configured to cause the apparatus to perform:
receiving information indicative of said maliciousness detection candidate that is determined as deviating from said set of training data by more than a predetermined threshold, and
incorporating said maliciousness detection candidate into said set of training data.

16. The apparatus according to claim 14, wherein said anomalous data detection model is adapted for validation of the maliciousness detection candidate regarding the deviation from said set of training data, and
the processor is further configured to cause the apparatus to perform:
receiving information indicative of a number of occurrences of maliciousness detection candidates determined as deviating from said set of training data by more than a predetermined threshold and/or information indicative of a percentage of maliciousness detection candidates determined as deviating from said set of training data by more than a predetermined threshold in maliciousness detection candidates corresponding to a predetermined period of time, and
deciding, based on said information indicative of said number and/or said information indicative of said percentage, on an action in relation to said malicious object detection model, wherein
said action in relation to said malicious object detection model includes at least one of
dropping said malicious object detection model,
updating said malicious object detection model, and
modifying said malicious object detection model.

17. An apparatus, comprising:
a memory configured to store computer program code, and
a processor configured to read and execute computer program code stored in the memory,
wherein the processor is configured to cause the apparatus to:
applying a machine learning based malware detection system, comprising:
receiving a malicious object detection model and an anomalous data detection model, said malicious object detection model characterizing each of at least two maliciousness related properties, wherein the at least two maliciousness related properties comprises a classification as malicious or a classification as clean, wherein said malicious object detection model is adapted based on feature combinations of more than one feature space of training data elements for classification of a maliciousness detection candidate as one of said at least two maliciousness related properties, wherein said anomalous data detection model being associated with said malicious object detection model and characterizing a set of training data for said malicious object detection model, and wherein said anomalous data detection model is adapted for validation of the maliciousness detection candidate regarding deviation from said set of training data;

receiving the maliciousness detection candidate, validating said maliciousness detection candidate against said malicious object detection model, validating said maliciousness detection candidate against said anomalous data detection model, and merging a result of said validating against said malicious object detection model and a result of said validating against said anomalous data detection model.

* * * * *

UNITED STATES PATENT AND TRADEMARK OFFICE
CERTIFICATE OF CORRECTION

PATENT NO. : 10,721,247 B2  
APPLICATION NO. : 15/823673  
DATED : July 21, 2020  
INVENTOR(S) : Dmitriy Komashinskiy and Paolo Palumbo Page 1 of 1

It is certified that error appears in the above-identified patent and that said Letters Patent is hereby corrected as shown below:

In the Claims

In Claim 14, Column 19, Line 59, delete "on the basis".

In Claim 14, Column 19, Line 60, delete "of" before the word "based".

Signed and Sealed this  
Twenty-fifth Day of August, 2020

Andrei Iancu  
*Director of the United States Patent and Trademark Office*